United States Patent
Fujii et al.

(10) Patent No.: US 6,645,589 B2
(45) Date of Patent: Nov. 11, 2003

(54) WHITE POLYESTER FILM FOR METAL PLATE LAMINATE, FILM-LAMINATED METAL PLATE AND METAL CONTAINER

(75) Inventors: Shingo Fujii, Inuyama (JP); Hideki Igushi, Inuyama (JP); Hiroshi Nagano, Inuyama (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/951,187

(22) Filed: Sep. 12, 2001

(65) Prior Publication Data
US 2002/0045051 A1 Apr. 18, 2002

(30) Foreign Application Priority Data

Sep. 12, 2000 (JP) ........................................ 2000-276839

(51) Int. Cl.$^7$ ........................ B32B 15/08; B32B 27/18; B32B 27/36; B32B 27/20
(52) U.S. Cl. .................... 428/35.8; 428/35.7; 428/35.9; 428/328; 428/212; 428/343; 428/344; 428/346; 428/347; 428/349; 428/355 R; 428/457; 428/458; 428/480; 428/910; 525/437; 525/444; 528/308; 528/308.1; 528/308.6; 528/308.7
(58) Field of Search ............................. 428/35.7, 35.8, 428/35.9, 457, 458, 480, 910, 328, 212, 343, 346, 347, 349, 355 R; 525/437, 444; 528/308, 308.1, 308.6, 308.7

(56) References Cited

U.S. PATENT DOCUMENTS 4,362,775 A 12/1982 Yabe et al.
5,384,354 A * 1/1995 Hasegawa et al. .......... 524/539
5,591,518 A * 1/1997 Sumiya et al. ............ 428/318.4
5,698,308 A * 12/1997 Sumiya et al. ............ 428/317.9
5,885,689 A * 3/1999 Hasegawa et al. .......... 428/141
6,150,012 A * 11/2000 Matsui et al. ................ 156/229

FOREIGN PATENT DOCUMENTS

| EP | 0 312 304 A1 | 4/1989 |
| EP | 0 580 404 A2 | 1/1994 |
| EP | 0 638 412 A1 | 2/1995 |
| EP | 0 928 684 A2 | 7/1999 |
| EP | 1 097 809 A1 | 5/2001 |
| JP | 05-331301 | * 12/1993 |
| JP | 06-218895 | * 8/1994 |
| WO | WO 96/15906 | 5/1996 |
| WO | WO 97/11847 | 4/1997 |

* cited by examiner

Primary Examiner—Vivian Chen
(74) Attorney, Agent, or Firm—Leydig, Voit & Mayer, Ltd.

(57) ABSTRACT

The present invention provides a white biaxially oriented polyester film having a two-layer structure of layer A/layer B, wherein the layer A contains a polyester having a melting point of 240° C.–260° C. and containing titanium dioxide in a proportion of 5–30 wt %, the layer B contains a polyester having a melting point of 210° C.–235° C., and the film shows a dimensional change of not more than 2%, which is obtained by thermally adhering a layer B side of the film to a metal plate to give a laminate, which is heat-treated at 210° C. for 2 minutes, and subjecting the film after the treatment to the measurement, a film-laminated metal plate using the polyester film and a metal container obtained by forming this film-laminated metal plate. The polyester film of the present invention has superior heat resistance and is capable of stably covering the surface of a metal plate even after a heat treatment during a can forming process and the like.

3 Claims, No Drawings

WHITE POLYESTER FILM FOR METAL PLATE LAMINATE, FILM-LAMINATED METAL PLATE AND METAL CONTAINER

TECHNICAL FIELD OF THE INVENTION

The present invention relates to a polyester film used for preventing corrosion of metal containers for food, such as soft drinks, beer, canned food etc., and the like, to a film-laminated metal plate having the film laminated on the metal plate, and to a metal container obtained by forming the film-laminated metal plate.

BACKGROUND OF THE INVENTION

It is a general and conventional practice to apply a coating on the inside and outside of a metal can to prevent corrosion, wherein the coating is generally made from a thermosetting resin.

For application of a thermosetting resin coating, a solvent type coating is used in most cases. The formation of a coating film requires heating at a high temperature for a long time, for example, 150–250° C. for several minutes. In addition, a large amount of the organic solvent scatters during baking, giving rise to a demand for an improvement including simplification of the process, prevention of pollution and the like.

The film formed under the aforementioned conditions inevitably contains a small amount of the organic solvent. When, for example, food is filled in a metal can having the above-mentioned film inside the can, the organic solvent may be transferred to the food to spoil the taste and flavor of the food. It also happens that the additive in the coating and a low molecular weight substance in the coating, which has been produced by incomplete crosslinking reaction, may be transferred to the food, thereby causing an adverse influence on the food, like the aforementioned residual organic solvent.

A different method for preventing corrosion is the use of a thermoplastic resin film. For example, a polyolefin film such as a polypropylene film and the like or a polyester film is laminated on a heated tin free steel and the resulting film-laminated metal plate is processed to give a metal can.

The use of the thermoplastic resin film resolves the above-mentioned problems of simplification of the process, prevention of pollution and the like.

Of the thermoplastic resin films, for example, when a polyolefin film, such as polyethylene and polypropylene, is used, heat history from a can forming process or heat history from a retorting treatment after can forming and the like may cause peeling off of the film from the film-laminated metal plate, because this film has poor heat resistance.

A method comprising the use of a polyester film as the thermoplastic resin film is most preferable, because the problems associated with the above-mentioned polyolefin film can be resolved.

A polyester film applied to the inside of a can shows superior heat resistance and allows only a small level of a low molecular weight substance to be generated. Consequently, it shows less occurrence of spoiled taste and flavor of food due to the transferred low molecular weight substance, as compared to a polyolefin film. In other words, this film is superior in preventing occurrence of spoiled flavor. When applied to the outside of a can, a polyester film is superior in heat resistance and when the film is whitened, an undercoat can be omitted.

However, the use of a polyester film containing polyethylene terephthalate as a main component for this end is not free from a problem. This is because a heat treatment during a can forming process after laminate processing, which aims at superior finish of the can, repairing a joint part of a can, and the like could cause dimensional changes only in the film part of the film-laminated metal plate due to the insufficient heat resistance of the polyester film, which in turn results in a loose film and a failure to completely cover the surface of a metal plate.

SUMMARY OF THE INVENTION

It is therefore an object of the present invention to provide a polyester film superior in heat resistance, opacifying property, barrier property and corrosion resistance, which is capable of stably covering the surface of a metal plate even after experiencing the heat history during the can forming process and the like, and which is preferably used for producing a metal container for food, a film-laminated metal plate superior in can forming processability, and a metal container having superior corrosion resistance and good appearance.

To achieve this object, the present invention provides a white biaxially oriented polyester film comprising a layer A and a layer B in a two-layer structure, wherein the layer A comprises a polyester having a melting point of 240° C.–260° C. and comprising titanium dioxide in a proportion of 5–30 wt %, the layer B comprises a polyester having a melting point of 210° C.–235° C., and the film shows a dimensional change of not more than 2%, which is obtained by thermally adhering a layer B side of the film to a metal plate to give a laminate, which is heat-treated at 210° C. for 2 minutes, and subjecting the film after the treatment to the measurement.

The film-laminated metal plate of the present invention comprises the above-mentioned polyester film laminated on at least one side of the metal plate.

The metal container of the present invention is obtained by forming the above-mentioned film-laminated metal plate.

DETAILED DESCRIPTION OF THE INVENTION

The white biaxially oriented polyester film of the present invention comprises a layer A and a layer B in a two-layer structure, wherein the layer A comprises a polyester having a melting point of 240° C.–260° C. and comprising titanium dioxide in a proportion of 5–30 wt %, the layer B comprises a polyester having a melting point of 210° C.–235° C., and the film shows a dimensional change of not more than 2%, which is obtained by thermally adhering a layer B side of the film to a metal plate to give a laminate, which is heat-treated at 210° C. for 2 minutes, and subjecting the film after the treatment to the measurement.

In the above definition, the "dimensional change, which is obtained by thermally adhering a layer B side of the film to a metal plate to give a laminate, which is heat-treated at 210° C. for 2 minutes, and subjecting the film after the treatment to the measurement" (hereinafter to be referred to as "dimensional change") is measured by the method to be mentioned later under "(1) Dimensional change of polyester film", which is measured as regards the state of a film-laminated metal plate.

The polyester to be used for the above-mentioned polyester film is obtained by condensation polymerization of polycarboxylic acid and polyhydric alcohol as main components. It may comprise only monomers or other components copolymerized according to the object.

Examples of the above-mentioned polycarboxylic acid component include dicarboxylic acid such as aromatic dicarboxylic acid (e.g., terephthalic acid, isophthalic acid, phthalic acid, naphthalenedicarboxylic acid, diphenyldicarboxylic acid and the like), aliphatic dicarboxylic acid (e.g., adipic acid, azelaic acid, sebacic acid, decanedicarboxylic acid, dodecanedicarboxylic acid, dimer acid and the like), alicyclic dicarboxylic acid (e.g., cyclohexanedicarboxylic acid and the like), and the like.

Examples of the polyhydric alcohol component include glycol such as aliphatic diol (e.g., ethylene glycol, diethylene glycol, triethylene glycol, propanediol, butanediol, hexanediol, dodecamethylene glycol, neopentyl glycol and the like), alicyclic diol (e.g., cyclohexane dimethanol and the like), aromatic diol (e.g., ethylene oxide adduct of bisphenol derivative and the like), and the like.

The polyester to be used for forming layer A is exemplified by those obtained from the above-mentioned dicarboxylic acid and glycol. Preferred one comprises a terephthalic acid-ethylene glycol component, more preferably a mixture of one containing a terephthalic acid-ethylene glycol component and one containing a terephthalic acid-butanediol component. More preferable one has a weight ratio (one containing a terephthalic acid-ethylene glycol component/one containing a terephthalic acid-butanediol component) of 98/2–50/50, particularly preferably 95/5–70/30.

Examples of the polyester to be used for layer B include, like layer A, a polyester obtained from the above-mentioned dicarboxylic acid and glycol. Preferred is a polyester that contains copolymerized polyester of terephthalic acid and isophthalic acid as an acid component (preferably, the molar ratio of terephthalic acid/isophthalic acid is 95/5–80/20, particularly preferably 95/5–85/15) and ethylene glycol as a glycol component.

The polyester to be used for forming layer A has a melting point of 240–260° C., preferably 245–255° C. When the melting point is less than 240° C., the heat resistance during a can forming process and the like becomes insufficient. When the melting point exceeds 260° C., the production becomes costly, which is economically disadvantageous.

The polyester to be used for the above-mentioned layer B has a melting point of 210–235° C., preferably 215–230° C. When the melting point is less than 210° C., the flowability of layer B increases due to the heat history during the can forming process and the like, and the dimensional changes of layer A may become unfavorably marked. When the melting point exceeds 235° C., it approaches the melting point of layer A, which in turn makes reduction or elimination of the residual shrinkage stress of layer A insufficient, again possibly making the dimensional changes of layer A unpreferably greater.

The above-mentioned polyester to be used for layer A and layer B has an intrinsic viscosity of preferably 0.5–1.5, more preferably 0.55–1.2, from the aspect of mechanical property and economic aspect.

Examples of titanium dioxide to be used in the polyester film of the present invention include titanium dioxides such as rutile, anatase and the like, which are used according to the object, such as tone, opacifying properties and the like. For example, a rutile-form titanium dioxide is superior to anatase-form titanium dioxide in a light blocking effect. For coating the outside of cans, rutile-form titanium dioxide is preferably used. A surface treatment may be applied to titanium dioxide according to the object.

The above-mentioned titanium dioxide is preferably particles and the average diameter thereof is preferably not less than 0.1 $\mu$m and less than 1.0 $\mu$m, more preferably not less than 0.2 $\mu$m and not more than 0.5 $\mu$m. When the average diameter is not less than 1.0 $\mu$m, the film may be broken or titanium dioxide particles may fall off during forming to degrade the productivity. On the other hand, when it is less than 0.1 $\mu$m, opacifying properties are degraded in relation to the wavelength, which is not economical.

By the average diameter here is meant a specific surface area average diameter, which is measured by an automatic surface area analyzer Model 2200 (manufactured by MICROMERITICS).

The content of titanium dioxide in layer A is 5–30 wt %, preferably 10–25 wt %. When the content is greater than 30 wt %, the productivity may decrease. When it is smaller than 5 wt %, the opacifying properties may be insufficient, though subject to change depending on the film thickness.

The layer B may or may not contain titanium dioxide, and the content thereof is not particularly limited. However, when the layer A is thin, the layer B preferably contains titanium dioxide for opacifying properties.

The method for adding titanium dioxide to the above-mentioned polyester film is not particularly limited. Examples thereof include a method comprising preparing a high concentration master batch in advance by a kneader and the like, mixing same to a predetermined concentration and supplying the resulting mixture to an extruder for melt extrusion.

In the above-mentioned polyester film, the layer A preferably has a thickness of 6–50 $\mu$m, more preferably 9–40 $\mu$m. When the thickness is less than 6 $\mu$m, the opacifying properties are degraded and when it exceeds 50 $\mu$m, the quality becomes too superior, which is not economical.

The layer B preferably has a thickness of 1–15 $\mu$m, more preferably 1–10 $\mu$m. When the thickness is less than 1 $\mu$m, the irregularities on the metal plate cannot be sufficiently buried, resulting in an adhesion failure. When the thickness is greater than 30 $\mu$m, the layer B has higher fluidity as in the case of lower melting point. Due to the heat history in a can forming step etc., the layer B has increased fluidity, thus resulting in unpreferable greater dimensional change of layer A.

The polyester film of the present invention shows the above-mentioned dimensional change of not more than 2%, preferably not more than 1%, more preferably not more than 0.8%. By setting the dimensional change to not more than 2%, the polyester film can stably cover the surface of a metal plate even after a heat treatment during a can forming process and the like.

The method for setting the dimensional change of the above-mentioned film to not more than 2% is not particularly limited. For example, the dimensional stability can be improved by achieving a high degree of crystallization by an increased rate of crystallization upon copolymerization with butanediol as the above-mentioned polyester component; applying heat setting to the polyester film at a temperature to be mentioned later to improve dimensional stability; applying a relaxation process to the polyester film after stretching, to improve dimensional stability; and the like.

The production method of the polyester film of the present invention is not particularly limited as long as a film having the above-mentioned characteristics can be obtained. For example, an unoriented sheet which is a two-layer structure of A/B, is obtained by a known method, such as multi-layer extrusion, extrusion laminating and the like, and this unoriented sheet is biaxially oriented by a known biaxial orientation method simultaneous orientation, sequential orientation and the like), followed by heat setting. Specifically, starting materials of layer A and layer B are respectively melt kneaded in two extruders, laminated in a die, taken up on a chill roll to give an unoriented sheet, which is drawn 2–5 times (preferably 3–4 times) in the longitudinal direction at 60–120° C. (preferably 70–100° C.), then 2–5 times (preferably 3–4 times) in the transverse direction at 80–120° C. (preferably 90–110° C.), followed by heat setting to produce the inventive film.

To make the above-mentioned dimensional change not more than 2%, for example, heat setting at a temperature in the range of from a temperature 5° C. (preferably 3° C.) lower than the melting point of the polyester constituting layer B to a temperature 15° C. (preferably 20° C.) lower than the melting point of the polyester constituting layer A is employed. By such heat setting, the residual shrinkage stress of layer A due to the biaxial orientation can be reduced or removed. The layer B is preferably converted to amorphous or made to be unoriented by heat history and the like, when the above-mentioned layer A is subjected to the aforementioned heat setting and the like to reduce or eliminate the residual shrinkage stress due to the biaxial orientation. As a result, when the film is laminated onto a preheated metal plate, sufficient adhesion of the laminate can be achieved even without preheating the metal plate to the melting point of layer B, whereby a low temperature and high speed laminating step can be realized.

In the layer A, when the polyester film is made of a polyester mainly containing polyethylene terephthalate, ethylene terephthalate cyclic trimer, which is one of the representative oligomers, may be extracted or removed from the film by the use of water or an organic solvent after film forming, or a polyester having a lower ethylene terephthalate cyclic trimer content may be used, in an attempt to retain a protective effect of food and superior appearance of cans.

With the aim of improving the can forming processability of and resistance to flaw (scratch resistance) of the polyester film of the present invention, crosslinked polymer particles and/or inorganic fine particles (other than titanium dioxide). These particles may be used alone or in combination of two or more kinds.

The above-mentioned crosslinked polymer particles are subject to no particular limitation as long as they have heat resistance to stand the temperature during melt forming of the polyester. Examples of the materials forming the crosslinked polymer particles include a copolymer of a monomer such as acrylic monomer (e.g., acrylic acid, methacrylic acid, acrylate, methacrylate and the like), styrene monomer (e.g., styrene, alkyl substituted styrene and like) and the like, and a crosslinking monomer (e.g., divinyl benzene, divinyl sulfone, ethylene glycol dimethacrylate, trimethylolpropane trimethacrylate, pentaerythritol tetramethacrylate and the like); melamine resin; benzoguanamine resin; phenol resin; silicone resin and the like. The crosslinked polymer particles can be produced from these materials by emulsion polymerization, suspension polymerization and the like known per se. The particle size and particle size distribution of the aforementioned crosslinked polymer particles may be adjusted by pulverization, classification and the like.

The above-mentioned inorganic fine particles are subject to no particular limitation as long as they are not titanium dioxide and insoluble in polyester and they are inactive. Examples thereof include metal oxide (e.g., silica, alumina, zirconia, titanium oxide except titanium dioxide and the like), compound oxide (e.g., kaolin, zeolite, sericite, sepiolite and the like), sulfate (e.g., calcium sulfate, barium sulfate and the like), phosphate (e.g., calcium phosphate, zirconium phosphate and the like), carbonate (e.g., calcium carbonate and the like) and the like. These inorganic fine particles may be naturally occurring or synthesized. The form of the particles is not particularly limited, either.

The above-mentioned crosslinked polymer particles and/or inorganic fine particles have an average diameter of preferably 0.5–5.0 µm, more preferably 0.8–4.0 µm. When the average diameter is less than 0.5 µm, a sufficient effect of improving the slidability between the film and metal at a high temperature cannot be achieved, allowing easy occurrence of scratches on the film. When it exceeds 5.0 µm, the above-mentioned effect tends to become saturated, the particles tend to fall off, and the film tends to get broken during film forming.

As used herein, the average diameter here is a volume average diameter which is obtained by measuring with a coulter counter (manufactured by Beckman Coulter, Inc.).

The polyester film contains the above-mentioned crosslinked polymer particles and/or inorganic fine particles in a proportion of 0.3–5.0 wt %, more preferably 0.5–3.0 wt %, of the total amount of the polyester film. When it is less than 0.3 wt %, the effect of improving the slidability between the film and metal at a high temperature becomes smaller, allowing easy occurrence of scratches on the film. When it exceeds 5.0 wt %, the above-mentioned effect tends to become saturated and the film tends to show lower film forming property.

The above-mentioned crosslinked polymer particles and/or inorganic fine particles may be added to the polyester film during the production step of the polyester resin. Alternatively, the above-mentioned components may be added to the polyester resin and the resin may be melt kneaded. It is also possible to produce a polyester resin containing the above-mentioned components at a high concentration, and using this as a master batch, to melt knead a polyester resin without the above-mentioned components or containing the above-mentioned components in a small amount, with the master batch.

Where necessary, the polyester film of the present invention may contain an antioxidant, a heat stabilizer, an ultraviolet absorber, a plasticizer, a colorant other than titanium dioxide, an antistatic agent, a lubricant, a crystal nucleating agent and the like.

The polyester film of the present invention may be subjected to a surface treatment. As the surface treatment, there are mentioned corona treatment, flame-plasma treatment and various coating methods such as inline coating, off-line coating and the like. Examples of the coating agent include an easy adhesive, an antistatic agent, a mold release agent, an anti-blocking agent and the like.

The film-laminated metal plate of the present invention can be obtained by laminating the above-mentioned polyester film on at least one side of a metal plate, and is superior in can forming processability.

The metal plate to be used for the above-mentioned film-laminated metal plate is not particularly limited, and is exemplified by tin plate, tin free steel, aluminum and the like. While the thickness of the metal plate is not particularly limited, it is preferably 100–1000 µm, more preferably 180–500 µm, from the economical aspects represented by costs of materials and the speed of can forming process, as well as for the maintenance of sufficient strength of the materials.

Known methods are applicable when laminating the polyester film on at least one side of the metal plate, and the method is not particularly limited. A preferable method is thermal lamination, and a particularly preferable method includes electrically heating the metal plate for thermal lamination. The polyester film may be laminated on both sides of the metal plate. In such a case, the film may be simultaneously laminated on the both sides or sequentially laminated.

When the polyester film of the present invention is laminated on at least one side of the metal plate, the layer B is laminated on the metal plate side, as mentioned above. In order to provide superior barrier property and superior corrosion resistance of the layer B and to improve adhesion to the laminate, the layer B or the metal plate may be previously coated with a known adhesive containing a thermosetting resin as a main component, before laminating the film.

The metal containers of the present invention can be obtained by forming the aforementioned film-laminated metal plate. The shape of the metal containers is not particularly limited. Examples thereof include a can, a bottle, a barrel and the like. The metal containers can be formed by any method. For example, known methods such as draw forming, iron forming, draw-iron forming and the like can be used.

The measurement methods of the properties of the film used in the present invention are shown in the following.

(1) Dimensional Change of Polyester Film

A degreased metal plate (thickness: 190 $\mu$m, tin free steel, manufactured by NIPPON STEEL CORPORATION) was preheated to 200° C., and the metal plate was placed on layer B side of a polyester film sample (thickness: 12 $\mu$m). The obtained product was passed in between rubber rolls pressurized at 500 N/cm, at a speed of 10 m/minute, and quickly cooled with water to give a film-laminated metal plate [thickness 202 $\mu$m (polyester film/metal plate=12 $\mu$m/190 $\mu$m)]. The obtained film-laminated metal plate was cut into a 60 mm×60 mm square to give a sample, wherein the sides are in parallel relation with the direction of longitudinal orientation of the film (the film machine direction) and the areas of the film sample and the metal plate were congruent. The obtained film-laminated metal plate sample was hung in the center of a hot-air oven adjusted to a wind velocity of 1–10 m/second, temperature 210° C., and heat treated for 2 minutes. The film-laminated metal plate sample was taken out from the oven, and immediately immersed in water at not more than 25° C. for one second or longer to rapidly cool the sample. The length of the film in the sample in the direction of transverse orientation (in the direction perpendicular to the machine direction) was read and taken as the size after heat treatment (I: unit mm). The dimensional change was calculated using the obtained I according to the following equation:

Dimensional change(%)=(|60−I|/60)×100

(2) Melting Point of Polyester

A sample was melted by heating at 300° C. for 5 minutes and rapidly cooled with liquid nitrogen. Using differential scanning calorimeter, the temperature peak of absorption caused by melting of crystals was measured while heating 10 mg thereof at a temperature elevating rate of 10° C./min.

(3) Intrinsic Viscosity of Polyester

A sample was dissolved in a mixed solvent of phenol/tetrachloroethane (6/4 weight ratio) at a concentration of 0.4 g/dl, and intrinsic viscosity was measured using an Ubbelohde's viscometer at 30° C.

(4) Average Diameter (a) Specific Surface Area Average Diameter

Using an automatic surface area analyzer Model 2200 (manufactured by MICROMERITICS), a specific surface area was determined and, regarding the particles to be spherical, the average diameter was determined from the formula (I).

Average diameter=6/specific gravity/specific surface area (I)

(b) Volume Average Diameter

Measured with a coulter counter (manufactured by Beckman Coulter, Inc.) with regard to a sample adjusted to have a concentration of 0.01 wt % relative to water.

EXAMPLE (Production of Polyester Film)

A mixture (melting point: 249° C., intrinsic viscosity: 0.66) of polyethylene terephthalate (melting point: 254° C., intrinsic viscosity: 0.62; 65 parts by weight), a master batch (content of rutile-form titanium dioxide particles: 50 wt %; 30 parts by weight) containing polyethylene terephthalate (melting point: 254° C., intrinsic viscosity: 0.62) and rutile-form titanium dioxide particles (average diameter 0.25 $\mu$m), and polybutylene terephthalate (melting point: 222° C., intrinsic viscosity: 0.85; 5 parts by weight) was used as a polyester for layer A. A copolymerized polyester (m.p. 215° C., intrinsic viscosity 0.62) of terephthalic acid/isophthalic acid (molar ratio 90/10) and ethylene glycol, which contained spherical silica (average diameter 1 $\mu$m; 0.1 wt %), was used as a polyester for layer B. The polyesters for layer A and layer B were melted in separate extruders. The obtained melts were mixed in a die and extruded onto a cooling drum to give an amorphous sheet. The amorphous sheet was stretched 3.5 times in the longitudinal direction at 90° C. and stretched 3.5 times in the transverse direction at 100° C., and heat-set at 220° C. to give a polyester film comprising layer A having a thickness of 9 $\mu$m and layer B having a thickness of 3 $\mu$m (total thickness 12 $\mu$m). The layer B in the polyester film was easily eroded by dichloromethane and was substantially unoriented.

(Production of Film-Laminated Metal Plate)

A degreased metal plate (thickness 190 $\mu$m, tin free steel, manufactured by NIPPON STEEL CORPORATION) was preheated to 200° C. The metal plate was placed on the surface of the layer B of the above-mentioned polyester film. The obtained product was passed in between rubber rolls pressurized at 500 N/cm at a speed of 10 m/min. Then, the laminate was rapidly cooled with water to give a film-laminated metal plate [thickness 202 $\mu$m (polyester film (layer A/layer B)/metal plate=12 $\mu$m (9 $\mu$m/3 $\mu$m)/190 $\mu$m)]. The obtained film-laminated metal plate was measured for the dimensional change of the polyester film, according to the above-mentioned (1). As a result, the change was 0.8%. The film-laminated metal plate had an appearance of whiteness of the level that permits omission of white printing as undercoating, and opacifying property.

(Production of Metal Container)

The aforementioned film-laminated metal plate was formed into a three-piece can. The metal plate enabled can forming process at a high speed. Furthermore, there was not found any problem such as looseness of the film, exposure of surface of the metal plate and the like after the heat treatment during the process. The can obtained in this way was filled with food, retorted at 125° C. for 30 minutes and subjected to a storage test at 40° C. for 6 months under high humidity. As a result, the can showed good corrosion resistance and good appearance, and was free of coloring.

The polyester film of the present invention has superior heat resistance and is capable of stably covering the surface of a metal plate even after a heat treatment during the can forming process and the like. In addition, the film is superior in opacifying properties, barrier property, corrosion resistance and the like. Therefore, the film obliterates exposure of the surface of a metal plate and the like, provides excellent finish of cans and affords metal containers superior in appearance.

This application is based on application No. 276839/2000 filed in Japan, the contents of which are incorporated hereinto by reference.

What is claimed is:

1. A white biaxially oriented polyester film comprising a layer A and a layer B in a two-layer structure, wherein (a) the layer A comprises a polyester mixture comprising a polyester containing a terephthalic acid-ethylene glycol component and a polyester containing a terephthalate acid-butanediol component, wherein the polyester mixture has a melting point of 240° C.–260° C. and comprises titanium dioxide in a proportion of 5–30 wt %, (b) the layer B comprises a polyester having a melting point of 210° C.–235° C. and does not comprise titanium dioxide, and (c) the film shows a dimensional change of not more than 2% when the film is thermally adhered on the layer B side of the film to a metal plate to provide a laminate is and then heat-treated at 210° C. for 2 minutes.

2. A film-laminated metal plate comprising the polyester film of claim 1 laminated on at least one side of the metal plate.

3. A metal container obtained by forming the film-laminated metal plate of claim 2.

* * * * *

UNITED STATES PATENT AND TRADEMARK OFFICE
CERTIFICATE OF CORRECTION

PATENT NO.    : 6,645,589 B2
DATED         : November 11, 2003
INVENTOR(S)   : Fujii et al.

It is certified that error appears in the above-identified patent and that said Letters Patent is hereby corrected as shown below:

<u>Column 10,</u>
Line 9, "is" should be deleted.

Signed and Sealed this

Fifteenth Day of June, 2004

JON W. DUDAS
*Acting Director of the United States Patent and Trademark Office*